United States Patent
Tsuneishi et al.

(10) Patent No.: US 9,611,953 B2
(45) Date of Patent: Apr. 4, 2017

(54) HOLLOW POPPET VALVE

(71) Applicant: NITTAN VALVE CO., LTD., Hadano-shi, Kanagawa (JP)

(72) Inventors: Osamu Tsuneishi, Kanagawa (JP); Naoya Ishihara, Kanagawa (JP)

(73) Assignee: NITTAN VALVE CO., LTD., Hadano-Shi (JP)

( * ) Notice: Subject to any disclaimer, the term of this patent is extended or adjusted under 35 U.S.C. 154(b) by 0 days.

(21) Appl. No.: 14/759,850

(22) PCT Filed: Mar. 14, 2013

(86) PCT No.: PCT/JP2013/057133
§ 371 (c)(1),
(2) Date: Jul. 8, 2015

(87) PCT Pub. No.: WO2014/141416
PCT Pub. Date: Sep. 18, 2014

(65) Prior Publication Data
US 2015/0354727 A1    Dec. 10, 2015

(51) Int. Cl.
*F16K 1/32* (2006.01)
*F16K 49/00* (2006.01)
(Continued)

(52) U.S. Cl.
CPC .............. *F16K 49/007* (2013.01); *B21K 1/22* (2013.01); *B23P 15/002* (2013.01); *F01L 3/14* (2013.01);
(Continued)

(58) Field of Classification Search
CPC ........ F16K 49/007; F16K 1/38; B23P 15/002; B21K 1/22; F01L 2103/00; F01L 2101/00;
(Continued)

(56) References Cited

U.S. PATENT DOCUMENTS

| 1,984,728 A | 12/1934 | Colwell |
| 1,984,751 A * | 12/1934 | McBride .................. B21K 1/22 |
| | | 29/888.452 |

(Continued)

FOREIGN PATENT DOCUMENTS

| JP | 62-062071 A | 3/1987 |
| JP | 03-023607 U | 3/1991 |

(Continued)

OTHER PUBLICATIONS

U.S. Appl. No. 14/783,492, filed Oct. 9, 2015, Tsuneishi et al.

(Continued)

*Primary Examiner* — Kevin Murphy
*Assistant Examiner* — Minh Le
(74) *Attorney, Agent, or Firm* — Foley & Lardner LLP

(57) ABSTRACT

A hollow poppet valve (10) has an internal cavity (S) which comprises a diametrically large valve head cavity (S1) formed in a valve head (14) and a diametrically small stem cavity (S2) formed in a stem (12) in communication with the valve head cavity (S1). The stem cavity has a diametrically larger first portion (S21) near the end of the stem and a diametrically smaller second portion (S22) near the valve head. A step (17) is formed at the boundary of the first and the second portion of the stem cavity (S2). The internal cavity is loaded with a coolant to a level above the step, together with an inert gas. In response to a reciprocal motion of the valve, turbulent flows of coolant (F9) are created in the neighborhood of the step (17), facilitating active stirring of the coolant (19) in the cavity (S).

7 Claims, 5 Drawing Sheets

(51) Int. Cl.
*F16K 1/38* (2006.01)
*F01L 3/14* (2006.01)
*B21K 1/22* (2006.01)
*B23P 15/00* (2006.01)
*F01L 3/08* (2006.01)
*F01L 3/10* (2006.01)

(52) U.S. Cl.
CPC *F16K 1/38* (2013.01); *F01L 3/08* (2013.01); *F01L 3/10* (2013.01); *F01L 2101/00* (2013.01); *F01L 2103/00* (2013.01); *Y10T 137/6579* (2015.04)

(58) Field of Classification Search
CPC ....... F01L 3/10; F01L 3/08; F01L 3/14; Y10T 137/6579
USPC ........................................ 137/334; 123/188.3
See application file for complete search history.

(56) References Cited

U.S. PATENT DOCUMENTS

| | | | | |
|---|---|---|---|---|
| 2,009,996 A * | 8/1935 | Gering, Jr. | ............... | B21K 1/22 29/423 |
| 2,274,667 A * | 3/1942 | Colwell | .................... | B22C 9/24 123/188.3 |
| 2,280,758 A | 4/1942 | Voorhies | | |
| 2,365,285 A | 12/1944 | McDill | | |
| 2,369,063 A | 2/1945 | McDill | | |
| 2,392,175 A * | 1/1946 | Norton | .................... | B21K 1/22 29/888.452 |
| 2,403,926 A * | 7/1946 | Johnson | .................... | F01L 3/04 123/188.3 |
| 2,410,190 A | 10/1946 | Townhill | | |
| 2,411,764 A * | 11/1946 | Thoren | .................... | B21K 1/22 29/888.45 |
| 2,450,803 A * | 10/1948 | Johnson | ................ | B23P 15/002 123/188.3 |
| 2,471,937 A * | 5/1949 | Colwell | ................ | B23K 5/006 219/104 |
| 2,544,605 A * | 3/1951 | Marion | .................... | F01L 3/16 123/41.41 |
| 2,682,261 A | 6/1954 | Achor | | |
| 4,147,138 A | 4/1979 | Haug | | |
| 5,168,843 A | 12/1992 | Franks | | |
| 5,413,073 A * | 5/1995 | Larson | ................... | B21D 22/21 123/188.3 |
| 5,769,037 A * | 6/1998 | Ohtsubo | ................... | F01L 3/14 123/188.9 |
| 5,771,852 A | 6/1998 | Heimann et al. | | |
| 6,912,984 B2 * | 7/2005 | Narasimhan | .......... | B23P 15/002 123/188.3 |
| 7,160,468 B2 * | 1/2007 | Matsuzaki | ............... | C09K 5/10 210/181 |
| 7,311,068 B2 | 12/2007 | Jackson | | |
| 7,344,655 B1 * | 3/2008 | Nishii | ..................... | C09K 5/10 252/75 |
| 8,881,391 B2 | 11/2014 | Morii et al. | | |
| 2004/0261746 A1 | 12/2004 | Narasimhan et al. | | |
| 2007/0240696 A1 | 10/2007 | Jackson | | |
| 2008/0006793 A1 * | 1/2008 | Hirnschal | ................ | B21K 1/22 251/356 |
| 2009/0020082 A1 * | 1/2009 | Suzuki | ..................... | F01L 3/14 123/41.41 |
| 2012/0255175 A1 | 10/2012 | Morii et al. | | |
| 2014/0352803 A1 * | 12/2014 | Onuma | ..................... | F01L 3/16 137/340 |

FOREIGN PATENT DOCUMENTS

| | | |
|---|---|---|
| JP | 04-076907 U | 7/1992 |
| JP | 2004-301124 A | 10/2004 |
| JP | 2006-097499 A | 4/2006 |
| JP | 2011-179328 A | 9/2011 |
| WO | WO 2010/041337 A1 | 4/2010 |

OTHER PUBLICATIONS

Tsuneishi: US Office Action on U.S. Appl. No. 14/783,492 dated Dec. 12, 2016.
Tsuneishi: US Office Action on U.S. Appl. No. 14/783,492 dated Jan. 26, 2017.

* cited by examiner (a)

(b)

(a)

(b)

HOLLOW POPPET VALVE

TECHNICAL FIELD OF THE INVENTION

This invention relates to a hollow poppet valve that has a valve head at one end of a stem and an internal cavity formed to extend from within the valve head into the stem, with the internal cavity charged with a coolant.

BACKGROUND ART

Patent Documents 1 and 2 listed below disclose such a hollow poppet valve as described above, in which its internal cavity is charged with a coolant (e.g. metallic sodium which has meting point of 98° C.) together with an inert gas, wherein the coolant has a higher heat conductivity than the valve material.

Since the internal cavity extends in the valve head cavity and stem, it may contain a large amount of coolant, which enhances heat transfer ability (hereinafter referred to as heat reduction effect) of a valve.

If a combustion chamber of an engine is heated to an exceedingly high temperature during an operation, knocking may occur, which lowers the fuel efficiency, and hence the power, of the engine. In order to lower the temperature of the combustion chamber, there has been proposed a method of storing a coolant in an inner cavity of a hollow poppet valve together with an inert gas to positively conduct heat from the combustion chamber via such valve (i.e. a method of enhancing heat reduction effect of the valve) to remove heat from the combustion chamber.

PRIOR ART DOCUMENTS

Patent Document

Patent Document 1: WO2010/041337
Patent Document 2: JPA Laid Open 2011-179328

SUMMARY OF THE INVENTION

Objects to be Achieved by the Invention

In conventional coolant-loaded hollow poppet valves, an internal cavity has a transient region (the region hereinafter referred to as interconnecting region) smoothly connecting a diametrically large internal cavity formed in a valve head (the cavity hereinafter referred to as valve head cavity) with a diametrically small linear stem cavity formed in the stem (the cavity hereinafter referred to as stem cavity), in which a liquefied coolant, stored together with an inert gas, is allowed to smoothly flow between the valve head cavity and the stem cavity during a port opening/closing operation of the valve (that is, during a reciprocal motion of the valve in its axial direction) to enhance the heat reduction effect of the valve.

It is noted, however, that since the interconnecting region is a smooth continuous passage, it allows smooth transfer of coolant in the axial direction of the valve and across the interconnecting region in response to an opening-closing operation of the valve, without appreciable mixing of the coolant in the upper, middle, and lower sections of the internal cavity.

Consequently, heat of hotter coolant in a lower portion of the cavity near the combustion chamber is not positively transferred to colder upper and middle coolant, so that the coolant does not fully contribute to the heat reduction effect (heat transferability) of the valve.

In view of such prior art problem as stated above, it is an object of the present invention to provide a hollow poppet valve having a step, formed at a predetermined axial position of the stem cavity in communication with the valve head cavity, for generating turbulence which promotes mixing of the coolant in the internal cavity to thereby enhance the heat reduction effect of the valve.

To achieve the object above, there is provided in accordance with the invention as recited in claim 1 a hollow poppet valve, comprising:

a stem;
a valve head integrally formed at one end of the stem; and
an internal cavity that extends from inside the valve head into the stem, the internal cavity loaded with a coolant together with an inert gas,
wherein the internal cavity has a valve head cavity of a large inner diameter formed in the valve head and a linear stem cavity of a small inner diameter formed in the stem and communicated with a central region of the valve head cavity at a substantially right angle,
wherein the stem cavity has a first portion near its open end (the portion hereinafter referred to as valve-head side cavity) and a second portion near a stem end of the stem (hereinafter referred to as stem-end side portion), both portions configured such that the second portion has a larger inner diameter than the first portion,
wherein an annular step is formed in, and at a predetermined axial position of, the stem cavity, and
wherein the internal cavity is loaded with the coolant to a level above the annular step.

(Function) In response to an upward/downward port opening/closing motion of the valve in an axial direction of the valve, the coolant is moved in the opposite axial direction of the internal cavity. Particularly, when the valve 10 is in a downward movement to open an exhaust port 6, the coolant is subjected to an upward inertial force, which causes the liquid coolant to be moved upward in the internal cavity. In this case, as the coolant 19 is moved from the diametrically small valve-head side portion to a diametrically larger portion near the stem end (the portion hereinafter referred to as stem-end side portion of the stem cavity), a turbulent flow F9 of coolant is created in the stem cavity downstream of the step, as shown in FIG. 3(*a*), thereby mixing the coolant in the stem cavity.

On the other hand, when the valve 10 is in a upward movement to close an exhaust port 6, the coolant once driven upward in the stem cavity is now subjected to a downward inertial force, which causes the coolant to be moved from the diametrically larger stem-end side portion of the stem cavity into the diametrically smaller valve-head side portion of the stem cavity. As a result, turbulent flows F10 are created in the stem cavity downstream of the annular step, so that the coolant in the stem cavity is stirred as shown in FIG. 3(*b*).

In this way, in response to a (downward) exhaust port-opening and an (upward) exhaust port-closing movement of the valve, the coolant is moved in the axial direction of the internal cavity, generating turbulent flows in the neighborhood of the step, which flows stir at least upper portions of the coolant in the internal cavity and facilitates the heat transfer by the coolant.

As recited in Claim 2, the step may be provided at a position in the stem cavity such that the step does not enter neither an exhaust port nor an intake port when the valve is installed either in the exhaust port or the intake port.

(Function) Since fatigue strength of a metal becomes decreases at higher temperatures, it is necessary to make the wall of the stem thick near the valve head so that the region can withstand a decrease in fatigue strength. On the other hand, although heat is transmitted to a stem-end side region of the stem by the coolant, the region is remote from the combustion chamber and is in contact with a valve guide, so that the heat is immediately dissipated from the stem-end side region to the cylinder head via the valve guide. Consequently, the stem-end side region will never be heated to a high temperature like the valve-head side region. Thus, if the stem-end side region of the stem is made thin to increase its inner diameter, that region will sustain its fatigue strength against heat, at least as much as the valve-head side region, suffering no fatigue failure (e.g. valve fracture due to fatigue).

Furthermore, firstly, if the inner diameter of the stem-end side portion of the stem cavity is increased, the total surface area of the stem cavity is increased. Consequently, the area of the surface of the stem cavity in contact with the coolant is increased to thereby increase the heat transfer efficiency of the stem. Secondly, the volume of the entire stem cavity can be increased while reducing the weight of the valve. Thirdly, by increasing the amount of the coolant, the heat reduction effect (heat transferability) of the stem is enhanced. Furthermore, if the annular step is provided as closer to the valve head as possible, its contribution to the heat reduction effect is increased.

For this reason, it is most desirable to provide the step at a position in the stem cavity such that the step always remain inside the valve guide, that is, outside the exhaust/intake port, during reciprocal motions of the valve.

As recited in Claim 3, the valve head cavity may be configured in the shape of a truncated circular cone having a tapered conic surface in parallel to the outer periphery of the valve head, wherein the stem cavity is configured to communicate with the valve head cavity at a substantially right angle at the ceiling of the valve head cavity, and wherein inner perimetric vertical circulatory (or convective) flows of coolant are created around the axis of the valve at least in the valve head cavity during each reciprocal motion of the valve.

(Function) When the valve 10 is in a downward movement to open an exhaust port 6, the coolant in the internal cavity is subjected to an upward inertial force as shown in FIG. 2(a). Since this (upward) inertial force then acting on the coolant is larger in the central region of the valve head cavity than in the surrounding region, the central coolant is urged to move into the stem cavity via the interconnecting region between the valve head cavity and the stem cavity. However, since an eave shape annular step is formed in the interconnecting region in such a way that the ceiling of the valve head cavity (or the peripheral region round the open end of the stem cavity) is a planar lace substantially perpendicularly to the central axis of the poppet valve, the coolant cannot smoothly flow into the stem cavity as in a conventional-hollow poppet valve.

In more detail, the upward inertial force generates radially inward flows F1 and F2 of coolant 19 that flow along the annular step (or the ceiling of the valve head cavity) towards the center of the interconnecting region as shown in FIG. 3(a). These flows F2 heading to the center of the interconnecting region collide with each other in the interconnecting region, resulting in downward flows F3 towards the bottom of the valve head cavity and upward flows F4 towards the stem cavity region S2. These flows F3 directed to the bottom of the valve head cavity flows radially outwardly along the bottom of the valve head cavity and they are eventually turned into radially inward flows F1 and then into flows F2 towards the center of the ceiling of the valve head cavity. On the other hand, the upward flows F4 and F5 directed into the upper stem cavity give rise to turbulence, as shown in FIG. 3(a).

In this way, a vertical inner parametric circulatory (or convective) flow of coolant 19 as indicated by a sequence of arrows F1→F2→F3→F1 is created in the valve head cavity S1 around the central axis of the valve 10, while turbulent flows of coolant 19 are created in the stem cavity S2 as indicated by arrows F4 and F5.

On the other hand, when the valve 10 is in an upward movement to close the exhaust port 6, the coolant 19 is subjected to a downward inertial force as shown in FIG. 2(b). Since the downward inertial force acting on the coolant 19 in the central region of the valve head cavity S1 is larger than that acting on the coolant, in the peripheral region, radially outward flows F6 of coolant are created along the bottom of the valve head cavity S1 from the central region of the valve head cavity as shown in FIG. 3(b). At the same time, downward turbulent flows F7 are created in the stem cavity S2 and across the interconnecting region. These flows F6 flowing along the bottom of the valve head cavity S1 are eventually redirected towards the ceiling of the valve head cavity S1, turned into flows F8 along the ceiling, and merge into the central flows F6 and F7 at the center of the ceiling.

In other words, a vertical inner parametric circulatory (or convective) flow of coolant 19 as indicated by a sequence of arrows F6→F8→F6 is created around the central axis of the valve 10 in the valve head cavity S1, while turbulent flows are created in the stem cavity S2 as indicated by arrow F7.

In this way, in response to the reciprocal motions of the valve, vertical circulatory flows of coolant F1→F2→F3→ and F6→F8 as well as turbulent flows F4, F5, F7, F9, and F10 are created widely in the entire internal cavity as shown in FIGS. 3(a) and (b), thereby positively mixing upper, middle, and lower layers of coolant in the internal cavity, thereby significantly improving the heat reduction effect (heat transferability) of the valve.

Effect of the Invention

According to the present invention, in response to an upward or a downward movement of the valve in port opening operation, turbulent flows of coolant are created in the neighborhood of the step formed in the stem cavity of the hollow poppet valve, causing mixing of at least upper and middle layers of the coolant in the internal cavity. Thus, heat transfer by the coolant is activated, thereby enhancing the heat reduction effect (heat transferability) of the valve and improving performance of the engine.

As recited in Claim 2, by diametrically enlarging the stem-end side portion of the stem cavity to an extent that will not affect the durability of the valve, the heat reduction effect (heat transferability) of the stem may be further enhanced while reducing the total weight of the valve, which contributes to a further improvement of the engine performance.

As recited in Claim 3, during each reciprocal motion of the valve port opening/closing operation, vertical inner parametric circulatory flows of coolant are formed in the valve head cavity, which causes active mixing of upper, middle, and lower layers of the coolant in the internal cavity. Consequently, the heat transfer in the internal cavity is enhanced by the coolant, thereby significantly improving the heat reduction effect (heat transferability) of the valve and the engine performance.

BRIEF DESCRIPTION OF THE DRAWINGS

FIG. 2(a) shows in cross sectional view an inertial force acting on the coolant during a downward motion of the valve, and FIG. 2(b) an inertial force acting on the coolant during an upward motion of the valve.

FIG. 3(a) shows a movement of the coolant when the valve 10 is in a downward movement to open an exhaust port, and FIG. 3(b) shows a movement of the coolant when the valve 10 is in an upward movement to close the exhaust port.

FIG. 4(a) shows a step of hot forging an intermediate valve product in the form of a valve shell; FIG. 4(b), a step of drilling a stem portion of the valve to form a bore that corresponds to an stem cavity; FIG. 4(c), a step of drilling the stem to form a bore that corresponds to a stem-end side portion of the stem cavity; FIG. 4(d), step of welding a stem end member; FIG. 4(e), a step of loading a coolant in the stem cavity together with a coolant; and FIG. 4(f), a step of welding a cap to an open end of a recess (or valve head cavity) of the valve head shell under an inert gas atmosphere.

BEST MODE FOR CARRYING OUT THE INVENTION

Figure 1:
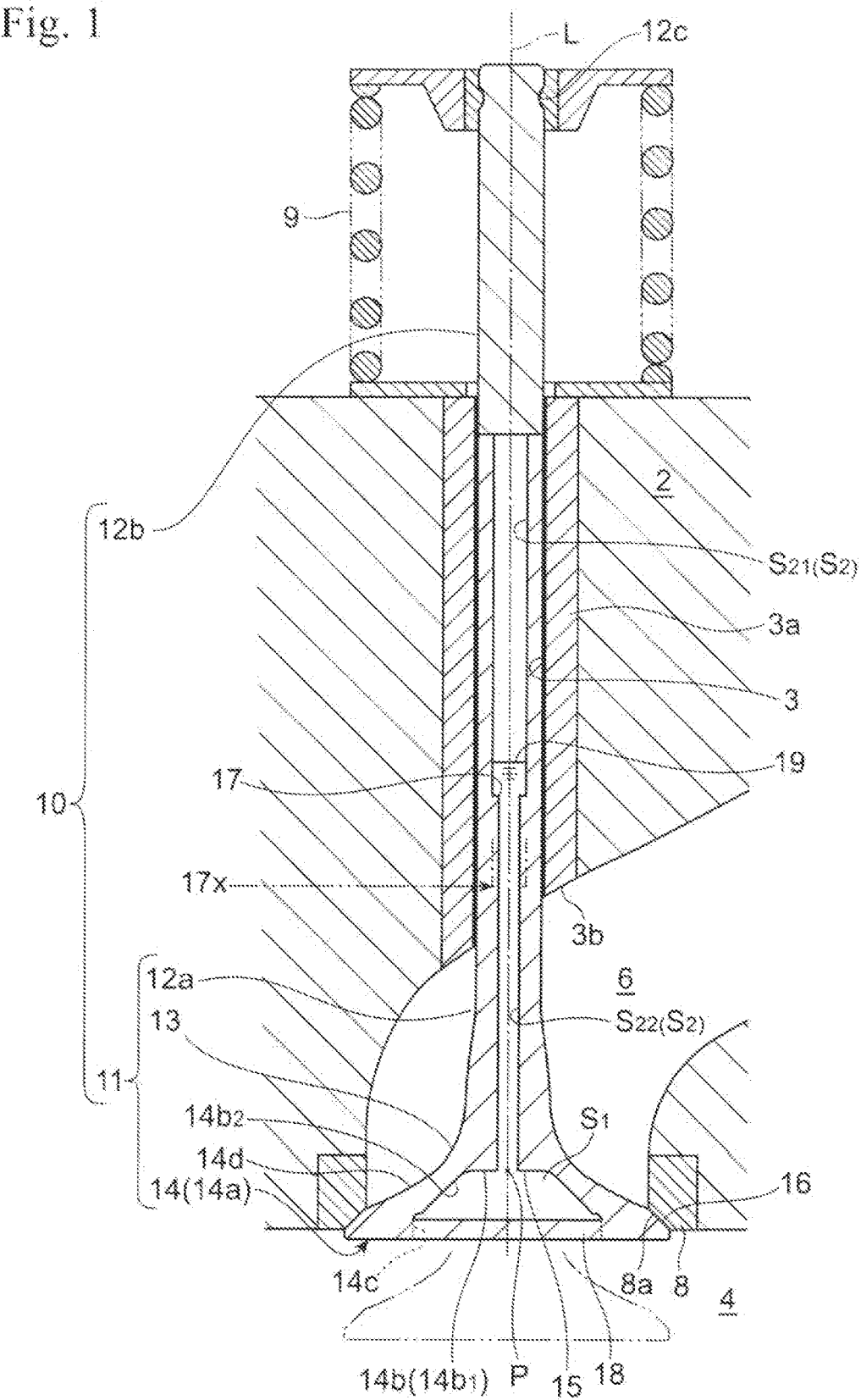
FIG. 1 is a longitudinal cross section of a hollow poppet valve in accordance with a first embodiment of the invention.

The present invention will now be described in detail by way of example with reference to two embodiments of the invention.

Referring to FIGS. 1 through 4, there is shown a hollow poppet valve for an internal combustion engine, in accordance with a first embodiment of the invention.

In these figures, a reference numeral 10 indicates a hollow poppet valve made of a heat resisting metal. The valve 10 has a valve head 14 and a straight stem 12 integrated at one end thereof with the valve head via a curved fillet portion 13 between the valve head 14 and the stem 12. The fillet portion 13 has a radially increasing outer diameter. The valve head 14 is provided on the outer periphery thereof with a tapered valve seat 16.

In more detail, a hollow poppet valve 10 comprises: an integral shell 11 (refer to FIGS. 1, 4) having a valve head shell 14a integrally formed at the end of a cylindrical stem 12a; a stem end member 12b welded to the other end of the stem portion 12a; and a circular disk-shape cap 18 welded to an open end 14c of the truncated conic recess 14b so as to form an internal cavity S that extends from within the valve head into the stem, wherein the inner cavity S is loaded with a coolant 19 such as metallic sodium, together with an inert gas such as argon. The heat reduction effect of the valve stem is anticipated to increase with the amount of the coolant. In actuality, however, it increases very little if the amount of the coolant exceeds a certain degree. From the point of cost-effective yet efficient cooling of the stem, it is preferable to load the inner cavity S in the range from about one half to four fifth by volume.

FIG. 1 shows a cylinder head 2 of the engine and an exhaust port 6 that extends from the combustion chamber 4 of the engine. Provided in a peripheral region of the combustion chamber 4 round the exhaust port 6 is an annular valve seat insert 8 having a tapered face 8a, on which the valve seat 16 of the valve 10 can be seated. Provided on the inner periphery of a valve insertion hole 3 formed in the cylinder head 2 is a valve guide 3a for guiding a stem 12 of the valve 10 in slidable contact with the valve guide 3a. The hollow poppet valve 10 is urged by a valve spring 9 to close the port. A keeper groove 12c is formed at one end of the stem. It is noted that the shell 11 and the cap 18 are made of a heat resisting steel so that they can withstand high temperatures when exposed to a high temperature gas in the combustion chamber 4 and the exhaust port 6. On the other hand, although the stem member 12b needs to have a sufficient mechanical strength, it needs not have heat resistance so much as the shell 11 and the cap 18, so that the stem end member 12b is made of an ordinary steel.

The internal cavity S of the valve 10 comprises a diametrically large valve head cavity S1 in the form of a truncated circular cone and a diametrically small linear cavity S2 formed in the stem 12 (the linear internal cavity hereinafter referred to as stem cavity S2) such that the valve head cavity S1 and the stem cavity S2 are communicated at a right angle. The circular ceiling 14b1 of the valve head cavity S1 (that is, the bottom of the truncated circular cone shape recess 14b of the valve head shell 14a, or the peripheral area round the open end of the stem cavity S1), is a planner face perpendicular to the central axis L of the hollow poppet valve 10.

Unlike smooth interconnecting regions disclosed in the references 1 and 2, the interconnecting region P between the large valve head cavity S1 and the stem cavity S2 is provided with an eave shape annular step 15 (as seen from the large internal cavity S1). A face 14b1 of the annular step 15 facing the valve head cavity S1 is flat and perpendicular to the central axis L of the hollow poppet valve 10. In other words, the eave shape annular step 15 is defined by the inner periphery of the stem cavity S2 and the peripheral area 14b1 round the open end of the stem cavity S2 (or the bottom of the truncated circular cone shape recess 14b inside the valve head outer shell 14a).

The stem cavity S2 comprises a diametrically larger stem-end side portion S21 and a diametrically smaller valve-head side portion S22, and an annular step 17 formed between the stem-end side portion S21 and the valve-head side portion S22. The stem cavity S2 is loaded with a coolant 19 to a level above the annular step 17.

As a consequence, during a reciprocal motion of the hollow poppet valve 10, a vertical inner perimetric circulatory (or convective) flow of coolant 19 is created in the valve head cavity S1 as indicated by a sequence of arrows F1→F2→F3 or F6→F8 in FIG. 3(a)-(b), and at the same time turbulent flows F4, F5, and F7 are created in the stem cavity S2 near the valve head cavity S1, and further turbulent flows F9 and F10 near the annular step 17, as described in more detail later.

Thus, because of the circulatory (or convective) flows and turbulent flows of coolant in the internal cavity S, upper, middle, and lower layers of the coolant in the internal cavity are actively mixed during a reciprocal motion of the valve 10, thereby greatly enhancing the heat reduction effect (or heat transferability) of the hollow poppet valve 10.

Particularly in this embodiment, since the circular ceiling (or the upper end face) 14b1 and the tapered face (peripheral conic face) 14b2 of the valve head cavity S1 make an obtuse angle, vertical circulatory (convective) flows of coolant 19 (F1, F2 shown in FIG. 3(a), and F8 shown in FIG. 3(b)) actively give rise to flows of the coolant directed towards, and radially inwardly along, the ceiling of the valve head cavity S1 and then to the interconnecting region P during reciprocal motions of the valve. Consequently, the coolant 19 in the internal cavity S is well stirred, significantly improving the heat reduction effect (heat transferability) of the valve 10.

Figure 2:
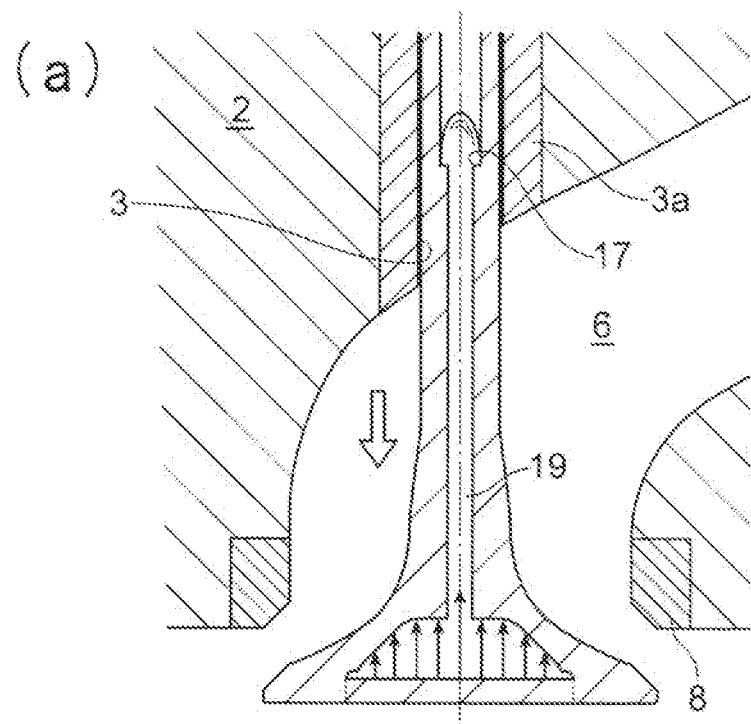
FIG. 2 is a diagram illustrating inertial forces that act on the coolant in the internal cavities of the poppet valve during reciprocal motions in its axial direction. More particularly.
Figure 2:
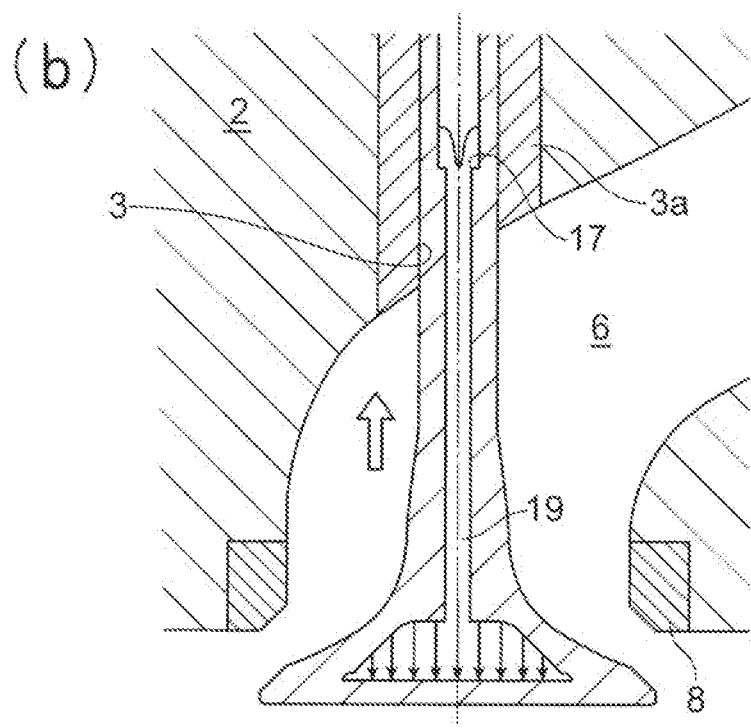
Figure 3:
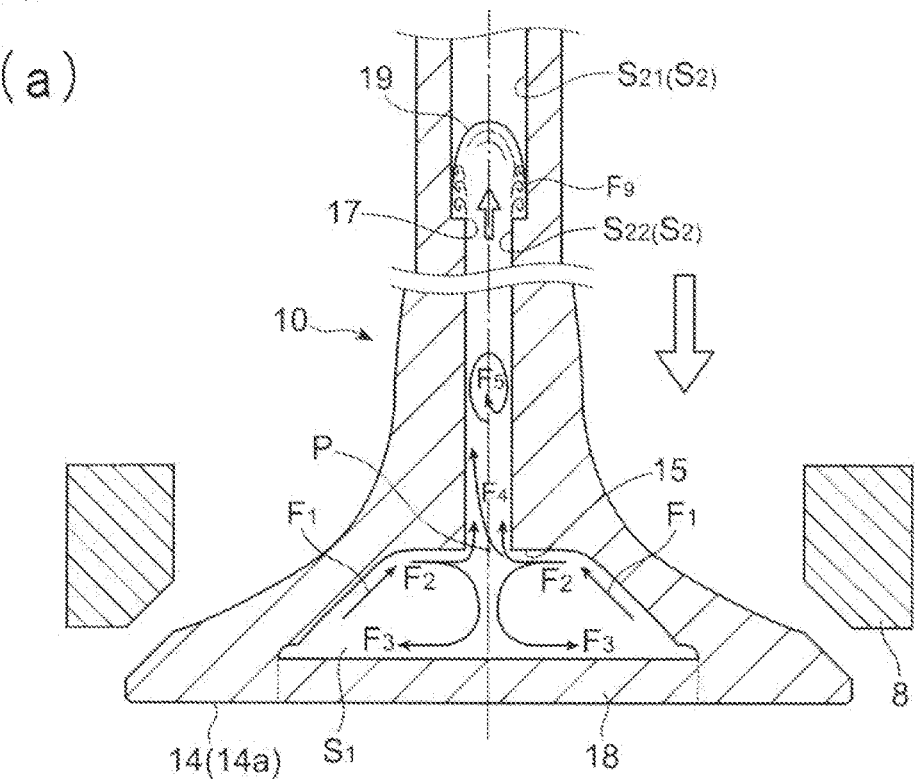
FIG. 3 shows enlarged views of the coolant in movement during reciprocal motions of the hollow poppet valve in its axial direction. More particularly.
Figure 3:
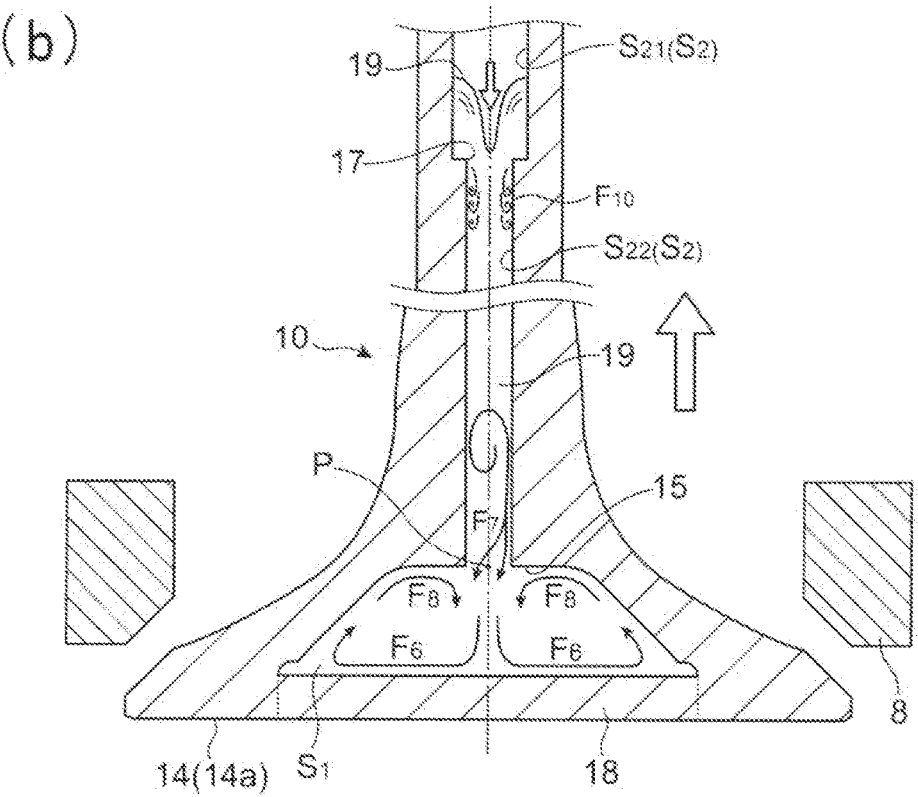

Next, behaviors of the coolant during a reciprocal motion of the valve 10 will now be described in detail with reference to FIGS. 2 and 3.

When the valve 10 is in a downward movement to open an exhaust port as shown in FIG. 2(a), an upward inertial force is acted upon the liquid coolant 19 in the internal cavity S. Since the upward inertial force acting on the central coolant 19 is greater in the central region of the valve head cavity S1 than in the peripheral region, the coolant 19 in the valve head cavity S1 tends to flow into the stem cavity S2 across the interconnecting region P. However, because of the annular step 15 formed at the interconnecting region P, the coolant cannot so smoothly move into the stem cavity S2 as in a conventional valve having a smooth interconnecting region.

Consequently, in the valve head cavity S1, radially inward flows F1 and F2 of coolant 19 towards the center of the interconnecting region P are formed by the upward inertial force, which will flow along the annular step 15 (or the ceiling 14b1 of the valve head cavity S1) as shown in FIG. 3(a). The radially inward flows F2 running along the annular step 15 towards the center of the interconnecting region P collide with each other, giving rise to flows F3 towards the bottom of the valve head cavity S1 and upward flows F4 towards the stem cavity S2.

The flows F3 heading to the bottom of the valve head cavity S1 will be re-directed radially outwardly by the bottom and change into the radially inward flows F1 and F2, heading again to the ceiling and further to the center of the interconnecting region P. On the other hand, the upward flows F4 and F5 exiting the interconnecting region P change into turbulent flows in the stem cavity S2, as shown in FIG. 3(a).

In this way, when the valve 10 is in a downward movement to open an exhaust port 6, a vertical inner parametric circulatory (convective) flow of coolant 19 as indicated by a sequence of arrows F1→F2→F3→F1 is created around the central axis L of the valve 10 in the valve head cavity S1, while turbulent flows F4 and F5 are created in the stem cavity S2.

Further, when the valve 10 is in a downward movement to open the exhaust port 6, an upward inertia force acts on the coolant 19 in the stem cavity S2, forcing the coolant to move upward in the stem cavity S2 across the annular step 17. This movement of the coolant from the diametrically smaller valve-head side portion S22 into the diametrically larger stem-end side cavity S21 generates a turbulent flow F9 downstream of the step 17, as shown in FIG. 3(a).

On the other hand, when the valve 10 is in an upward movement to close the exhaust port 6, the coolant 19 in the internal cavity S is subjected to a downward inertial force as shown in FIG. 2(b). In this case, since the downward inertial force acting on the coolant 19 is larger in a central region of the valve head cavity S1 than in a peripheral region, the coolant 19 in the central region descends to the bottom of the cavity, which turns out to be radially outward flows F6 along the bottom of the valve head cavity S1 as shown in FIG. 3(b). At the same time, a downward turbulent flow F7 is created across the center of the interconnecting region P in the stem cavity S2. The flows F6 along the bottom of the valve head cavity S1 are re-directed radially inwardly and eventually change into flows F8 along the ceiling of the cavity S1 and merge into the downward flows F6 and F7 in the central interconnecting region P.

In other words, a vertical circulatory (or convective) flow of coolant 19 are created in the valve head cavity S1 around the central axis of the valve 10, as indicated by the sequence of arrows F6→F8→F6, while a turbulent flow F7 is created in the stem cavity S2.

In addition, when the open valve 10 is closed, undergoing an upward motion, the liquid coolant 19, once moved upward into the stem cavity S2, is now subjected to a downward inertial force, so that the coolant 19 is moved in the stem cavity S2, from the diametrically larger stem-end side portion S21 into the diametrically smaller valve-head side portion S22 across the annular step 17, creating a turbulent flow F10 as shown in FIG. 3(b).

In this way, such convection (circulation) and turbulence of coolant 19 that take place in the entire internal cavity S during reciprocal motions of the valve 10 positively stir upper, middle, and lower layers of the coolant in the internal cavity S, greatly improve the heat reduction effect (or heat transferability) of the valve 10.

It is noted that the annular step 17 is provided at an axial position (of the internal cavity S) that corresponds to a substantial end 3b of a valve guide 3, facing the exhaust port 6 as shown in FIG. 1. It is also noted that the diametrically larger stem-end side portion S21 is sufficiently long and has a larger inner diameter than the rest of the stem cavity, so that not only the area of the stem 12 in contact with the coolant 19 is increased to improve the heat transfer efficiency of the stem 12 but also the thickness of the cavity wall is reduced to reduce the weight of the valve 10. This can be done without loosing the durability of the valve 10. In short, the annular step 17 is provided at a predetermined position in the stem cavity such that the thin cavity wall of the diametrically larger portion S21 never enter the exhaust port 6 and will not be subjected to a hot exhaust gas in the exhaust port 6, even when the valve is fully opened (fully lowered) to its lowest position shown by a phantom line in FIG. 1. 17x as shown in FIG. 1 indicates the position of the annular step 17 when the valve is fully opened (fully lowered).

Specifically, in order to prevent a portion of the stem 12 near the valve head 14 from losing its fatigue strength when exposed to a high temperature in the exhaust port 6, it is necessary to make the wall of that portion sufficiently thick. On the other hand, although heat is transmitted from the combustion chamber 4 and the exhaust port 6 to the valve-head side portion of the stem 12, that portion will not be heated to a high temperature as compared with the valve-head side portion (close to the vale head 14), since that portion is remote from the combustion chamber and in contact with the valve guide 3a via the coolant 19, so that the heat is instantly dissipated from that portion to the cylinder head 2 via the valve guide 3a.

That is, since the stem-end side portion of the stem 12 is less likely to loose its fatigue strength than the valve-head side portion of the stem 12, the former portion will not suffer from such a durability problem as fatigue failure if the wall thickness of the stem-end side portion S21 is decreased to increase the inner diameter of that portion S21.

In one embodiment of the present invention, therefore, the annular step 17 is located (in association with the lower end 3b of the valve guide 3) as low as possible in the stem-end side portion S21 so long as the annular step 17 does not enter the exhaust port 6 when the valve is fully lowered (to open the port). By enlarging the inner diameter of the diametrically larger portion S21, the entire surface area of the stem cavity S2 in contact with the coolant is firstly increased to enhance the heat transfer efficiency of the stem 12, and secondly the entire volume of the diametrically larger portion S21 is increased, so that the weight of the valve 10 is reduced.

Figure 4:
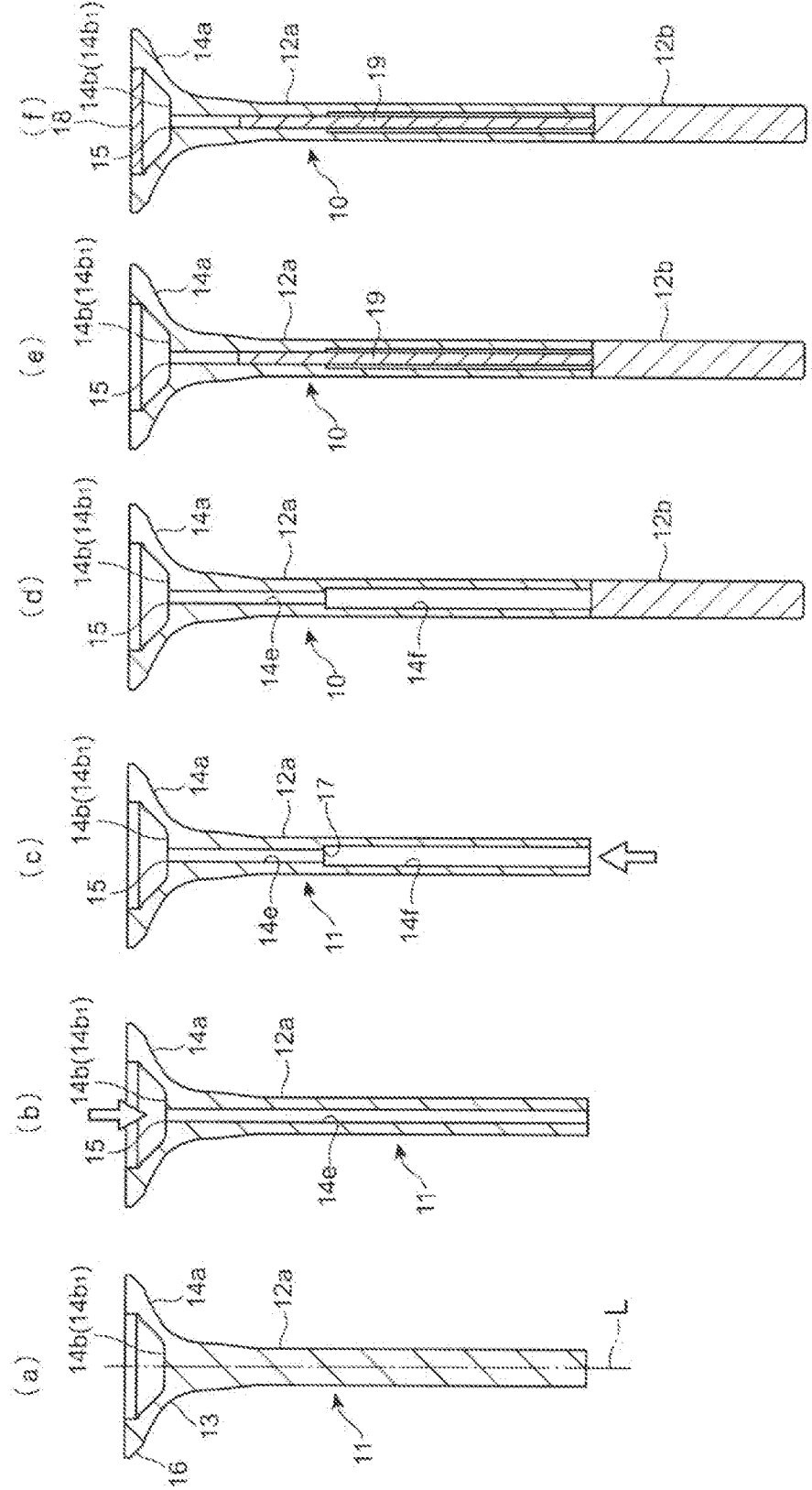
FIG. 4 shows steps of manufacturing a hollow poppet valve. More particularly.

Next, referring to FIG. 4, there is shown a process of manufacturing a hollow poppet valve 10 in accordance with the present invention.

Firstly, a shell 11 is formed by hot forging such that it comprises a valve head shell 14a having a truncated circular corn shape recess 14b and a stem 12a, which is integral with the shell 11 as shown in FIG. 4(a). The bottom 14b1 of the recess 14b formed inside the valve head shell 14a is flat and perpendicular to the stem 12 (and to the central axis L of the shell 11).

The shell 11 may be hot forged from a heat resisting steel block by repetitively extruding the block through different metallic dies, or by forging a valve head shell 11 (of a valve head shell 14a) with dies after a semi-spherical section is formed at one end of a heat resisting steel bar by upset forging. In this hot forging, a curved fillet portion 13 is formed between the valve head shell 14a and the stem portion 12a, and a tapered valve seat 16 is formed on the periphery of the valve head shell 14a.

Next, the shell 11 is held with its recess 14b oriented upward as shown in FIG. 4(b) and is drilled in the bottom surface 14b1 of the recess 14b to form a bore 14e for a diametrically smaller portion S22 of the stem cavity S2 in the stem 12, (a step of drilling a stem portion of the valve)

In this drilling process, the recess 14b of the valve head shell 14a is communicated with the bore 14e of the stem 12 such that an eave shape annular step 15 is formed in a region interconnecting the recess 14b (that will serve as the valve head cavity S1) and the bore 14e (that will serve as the stem cavity S22).

In the next boring step, the stem end of the shell 11 is drilled to form a bore 14f that corresponds to the diametrically larger portion S21 as shown in FIG. 4(c).

Next, a stem end member 12b is welded to the stem end of the shell 11 as shown in FIG. 4(d). Then, in a coolant loading step, a predetermined amount of (solidified) coolant 19 is loaded in the bore 14e of the recess 14b, as shown in FIG. 4(e).

Lastly, in a cavity closing step, a cap 18 is welded (by resistance welding for example) onto the open end 14c of the recess 14b of the valve head shell 14a under an argon gas atmosphere, thereby sealing the cavity to form the internal cavity S in the hollow poppet valve 10 as shown in FIG. 4(f). The cap may be alternatively welded by electron beam welding or by laser beam welding.

Figure 5:
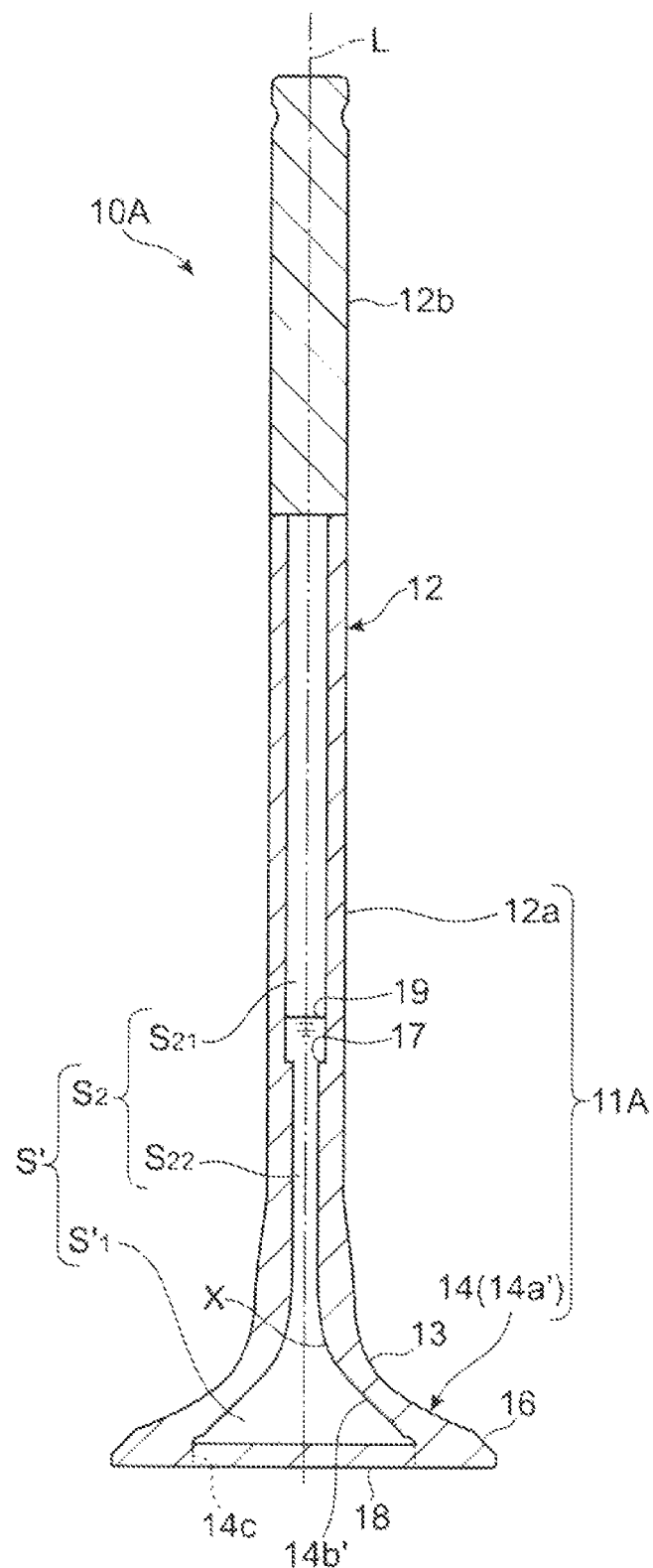
FIG. 5 is a longitudinal cross section of a hollow poppet valve in accordance with a second embodiment of the invention.

Referring to FIG. 5, there is shown a hollow poppet valve in accordance with a second embodiment of the invention.

As described above, the poppet valve 10 of the first embodiment has a valve head cavity S1 in the form of a truncated circular cone in shape formed in the valve head 14, and a linear stem cavity S2 communicated with the valve head cavity S1 perpendicularly to the ceiling of the valve head cavity S1. In contrast, the hollow poppet 10A of the second embodiment has an stem cavity S2 in the stem 12 in communication with a circular cone shape inner cavity S'1 formed in the valve head 14, via a smoothly curving transitional region X (having a smoothly varying inner diameter) as in prior art valves disclosed in the documents 1 and 2.

In other words, an integral shell 11A, which is an intermediate valve product, has a valve head shell 14a' integrally formed at one end of a cylindrical stem 12a. The valve head shell 14a' has a recess 14b' in the shape of a truncated circular cone to serve as a valve head cavity S'1.

Other features of the second embodiment are the same as those of the hollow poppet valve 10 shown in the first embodiment. The same or like elements of the first and second embodiments are referred to by the same reference numerals, and further description of the second embodiment will be omitted.

As in the foregoing hollow poppet valve 10 in accordance with the first embodiment, turbulent flows (not shown) of coolant are created in this hollow poppet valve 10A, in the neighborhood of the annular step 17 every time the coolant 19 is moved in one axial direction of the stem cavity S2 during each reciprocal motion of the valve 10A, so that the coolant 19 is well mixed in the stem cavity S2, at least in the upper and middle layers of the coolant in the internal cavity S', thereby facilitating the heat transfer by the coolant 19 in the internal cavity S to improve the heat reduction effect of the valve 10A.

BRIEF DESCRIPTION OF THE DRAWINGS 10 and 10A hollow poppet valves
11 and 11A shell (of a valve head integral with a stem)
12 stem of valve
12a stem
12b stem member
14 valve head
14a, 14a' valve head shells
14b and 14b' recesses formed in the valve head shells
14b1 circular ceiling of valve head cavity
14b2 conic surface of truncated circular-cone shape valve head cavity formed in the shell
15 eave shape annular step formed on the ceiling of valve head cavity round open end of stem cavity
17 annular step
18 cap
19 coolant
L central axis of valve
S and S' internal cavities
S1 and S'1 internal valve head cavities
S2 stem cavity
S21 diametrically larger stem-end side portion of the stem cavity
S22 diametrically smaller valve-head side portion of the stem cavity
P interconnecting region
F1→F2→F3; F6→F8 vertical inner parametric circulatory (or convective) flows around the axis of a valve

The invention claimed is:

1. A hollow poppet valve, comprising:
a stem;
a valve head integrally formed at one end of the stem; and
an internal cavity that extends from inside the valve head into the stem, the internal cavity loaded with a coolant together with an inert gas,
wherein the internal cavity has a valve head cavity of a large inner diameter formed in the valve head and a linear stem cavity of a small inner diameter formed in the stem and communicated with a central region of the valve head cavity at a substantially right angle, wherein the stem cavity has a first portion near the valve head and a second portion near a stem end of the stem, both portions configured such that the second portion has a larger inner diameter than the first portion, wherein an annular step is formed in, and at a predetermined axial position of, the stem cavity, wherein the internal cavity is loaded with the coolant in the valve head cavity and in the stem cavity to a level above the annular step, and wherein a turbulent flow of coolant is created in the stem cavity downstream of the annular step during a reciprocating axial motion of the valve.

2. The hollow poppet valve according to claim 1, wherein the step is provided at a position in the stem cavity such that the step does not enter either an exhaust port or an intake port when the valve is installed in either the exhaust port or the intake port.

3. The hollow poppet valve according to claim 1, wherein the valve head cavity is configured in the shape of a substantially truncated circular cone having a conic surface in parallel to an outer periphery of the valve head, wherein a peripheral region located around an open end of the stem cavity and forming a ceiling of the valve head cavity is a planar face substantially perpendicular to a central axis of the poppet valve, and wherein, in response to reciprocating axial motion of the valve, a vertical inner perimetric circulatory or convective flow of coolant is created in the valve head cavity around the central axis of the valve, while the turbulent flow of coolant is created in the stem cavity.

4. The hollow poppet valve according to claim 2, wherein the valve head cavity is configured in the shape of a substantially truncated circular cone having a conic surface in parallel to an outer periphery of the valve head, wherein a peripheral region located around an open end of the stem cavity and forming a ceiling of the valve head cavity is a planar face substantially perpendicular to a central axis of the poppet valve, and wherein, in response to reciprocating axial motion of the valve, a vertical inner perimetric circulatory or convective flow of coolant is created in the valve head cavity around the central axis of the valve, while the turbulent flow of coolant is created in the stem cavity.

5. A hollow poppet valve, comprising:

a stem;

a valve head integrally formed at one end of the stem; and an internal cavity that extends from inside the valve head into the stem, the internal cavity loaded with a coolant together with an inert gas, wherein the internal cavity includes a valve head cavity formed in the valve head and a stem cavity formed in the stem that communicates with a central region of the valve head cavity, wherein the valve head cavity has a larger inner diameter than the stem cavity, wherein the stem cavity has a first portion near the valve head and a second portion near a stem end of the stem, the second portion having a larger inner diameter than the first portion, wherein the stem cavity includes an annular step formed at a predetermined axial position of the stem cavity, wherein the internal cavity is loaded with the coolant in the valve head cavity and in the stem cavity to a level above the annular step, and wherein a turbulent flow of coolant is created in the stem cavity downstream of the annular step during a reciprocating axial motion of the valve.

6. The hollow poppet valve of claim 5, wherein the valve head cavity has a substantially smoothly curving transitional region of a substantially smoothly varying inner diameter.

7. The hollow poppet valve of claim 5, wherein the valve head cavity is configured in the shape of a truncated circular cone having a tapered conic surface.

* * * * *